United States Patent [19]

Kimura et al.

[11] Patent Number: 5,044,732
[45] Date of Patent: Sep. 3, 1991

[54] LIQUID-CRYSTAL DISPLAY DEVICE

[75] Inventors: Naofumi Kimura; Yutaka Ishii; Shuichi Kozaki, all of Nara, Japan

[73] Assignee: Sharp Kabushiki Kaisha, Osaka, Japan

[21] Appl. No.: 172,044

[22] Filed: Mar. 23, 1988

[30] Foreign Application Priority Data

Mar. 23, 1987 [JP] Japan .................................. 62-69926

[51] Int. Cl.$^5$ ............................................. G02F 1/133
[52] U.S. Cl. ........................................ 359/53; 359/102
[58] Field of Search ..................... 350/335, 346, 347 E

[56] References Cited

U.S. PATENT DOCUMENTS

| 4,408,839 | 10/1983 | Wiener-Avnear | 350/335 X |
| 4,508,427 | 4/1985 | Ross | 350/335 |
| 4,610,507 | 9/1986 | Kamamori et al. | 350/335 |
| 4,779,960 | 10/1988 | Kozaki et al. | 350/346 |
| 4,844,569 | 7/1989 | Wada et al. | 350/335 |

FOREIGN PATENT DOCUMENTS

| 131216 | 1/1985 | European Pat. Off. . |
| 55-110216 | 8/1980 | Japan .................................. 350/335 |
| 56-156816 | 12/1981 | Japan . |
| 2065321 | 11/1979 | United Kingdom . |
| 2092769 | 8/1982 | United Kingdom . |

Primary Examiner—Stanley D. Miller
Assistant Examiner—Anita Pellman Gross
Attorney, Agent, or Firm—Irell & Manella

[57] ABSTRACT

A liquid-crystal display device comprising a double-layered-type liquid-crystal cell that is composed of a first cell layer and a second cell layer, said cell containing liquid-crystal molecules with a twisted nematic orientation therein and a voltage-applying means in one of the first and second cell layers, wherein the angle of twist of the liquid-crystal molecules in the first cell layer is opposite to that of twist of the liquid-crystal molecules in the second cell layer, and the orientation of the liquid-crystal molecules in the first cell layer in the vicinity of the second cell layer is at right angles to that of the liquid-crystal molecules in the second cell layer in the vicinity of the first cell layer.

3 Claims, 10 Drawing Sheets

LIQUID-CRYSTAL DISPLAY DEVICE

BACKGROUND OF THE INVENTION

1. Field of the invention:

This invention relates to a multi-layeredtype liquid-crystal display device with the use of a twisted nematic display process that can attain an excellent color display.

2. Description of the prior art:

Liquid-crystal display devices are now being used in clocks and electronic calculating machines, and in computer terminals, word processor displays, televisions, and a variety of other uses in many fields. Recently, there has been an extremely large demand for liquid-crystal display devices because of the changes to multicolor and full-color displays, which are already being made use of in the fields of graphic display and image display. Color displays that have been widely put into practical use are attained by a liquid-crystal cell with color filter layers. The liquid-crystal cell functions as a light-switcher, and produces various colors. The main kind of display mode is a twisted nematic display mode attained by a liquid-crystal cell in which the liquid-crystal molecules are twisted 90° so that high contrast, etc., can be obtained. However, with this TN display mode, the dependence of the display characteristics on the wavelength of light is great, and it is not possible to achieve switching of light uniformly over the entire spectrum of visible light. In particular, with the normally closed display process in which the axes of absorbance of the two polarizers are in parallel, there is the problem that light leakages at the time of the application of voltage gives rise to color.

With a color display device that causes light-switching by the use of a TN display that has this kind of a color filter layer, there are two main kinds of driving methods. One of them involves the active-matrix drive method that uses a liquid-crystal cell that has picture elements provided with non-linear devices such as diodes or switching elements such as thin-film transistors. The other method involves the duty drive method in which the liquid crystals of a liquid-crystal cell without picture elements are successively driven. With the latter method, the steepness in the vicinity of the threshold value of the optical characteristics of the liquid crystals is important; this is a problem with the TN displays that are being used now. In order to improve the optical characteristics so that steepness in the vicinity of the threshold value can be attained, there has been suggested a supertwisted birefringence effect (SBE) process that gives liquid-crystal molecules that are twisted at angles of around 180°-270°. With the SBE process, the curve in the vicinity of the threshold value increases sharply, and even when the duty ratio increases, it is possible to obtain a high contrast ratio. However, because birefringence effects of liquid crystals are used, the dependence of the display characteristics on the wavelength is theoretically higher than with the TN display, so it is very difficult to adapt it for use in a full-color display.

SUMMARY OF THE INVENTION

The liquid-crystal display device of this invention, which overcomes the above-discussed and numerous other disadvantages and deficiencies of the prior art, comprises a double-layered-type liquid-crystal cell that is composed of a first cell layer and a second cell layer, said cell containing liquid-crystal molecules with a twisted nematic orientation therein and a voltage-applying means in one of the first and second cell layers, wherein the angle of twist of the liquid-crystal molecules in the first cell layer is opposite to that of twist of the liquid-crystal molecules in the second cell layer, and the orientation of the liquid-crystal molecules in the first cell layer in the vicinity of the second cell layer is at right angles to that of the liquid-crystal molecules in the second cell layer in the vicinity of the first cell layer.

In a preferred embodiment, the angles of twist of the liquid-crystal molecules in the first and second cell layers are nearly equal to each other, and the products $\Delta n \cdot d$ of the birefringence $\Delta n$ and the thickness $d$ of the liquid-crystal layers in each of the first and second cell layers are nearly equal to each other.

In a preferred embodiment, the angles of twist of the liquid-crystal molecules in the first and second cell layers are nearly equal to each other, and the product $\Delta n_1 \cdot d_1$ of the birefringence $\Delta n_1$ and the thickness $d_1$ of the liquid-crystal layer in one of the first and second cell layers that undergoes an optical change because of an external force and the product $\Delta n_2 \cdot d_2$ of the birefringence $\Delta n_2$ and the thickness $d_2$ of the liquid-crystal layer in the other cell layers that does not undergo an optical change are represented by the following inequality:

$$\Delta n_2 \cdot d_2 < 0.85 \Delta n_1 \cdot d_1.$$

In a preferred embodiment, the angle of twist of the liquid-crystal molecules in each of the first and second cell layers is in the range of 180° to 360°.

In a preferred embodiment, the relationship between the pitch p of twist of the liquid-crystal molecules in the cell layer that has the voltage-applying means therein and the thickness d of the liquid-crystal layer in the said cell layer is as follows:

$$\theta/2\pi - \tfrac{1}{4} < d/p \lesssim \theta/2\pi,$$

wherein $\theta$ is the angle of twist of the liquid-crystal molecules.

In a preferred embodiment, a color filter layer is disposed in at least one of the first and second cell layers.

In a preferred embodiment, an active device is disposed on each picture element in at least one of the first and second cell layers.

Thus, the invention described herein makes possible the objectives of (1) providing a liquid-crystal display device that produces a colored display image with superior color reproducibility and high contrast; and (2) providing a liquid-crystal display device that attains a full-color display or a multicolor display.

BRIEF DESCRIPTION OF THE DRAWINGS

This invention may be better understood and its numerous objects and advantages will become apparent to those skilled in the art by reference to the accompanying drawings as follows.

DESCRIPTION OF THE PREFERRED EMBODIMENTS

Figure 1:
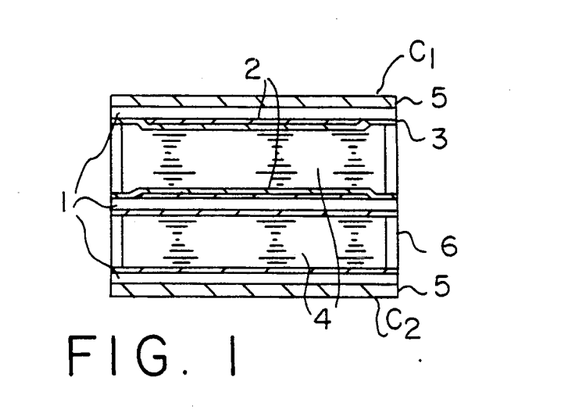
FIG. 1 is a sectional view showing the fundamental cell structure of a double-layered-type liquid-crystal display device of this invention.

This invention provides a liquid-crystal display device, the fundamental double-layered cell structure of which is, as shown in FIG. 1, composed of a first cell layer $C_1$ and a second cell layer $C_2$ that contains liquid-crystal molecules therein with a twisted nematic orientation. Each cell layer is composed of transparent substrates 1 of glass, acrylic resins, or the like, transparent conductive films 2 of ITO, nesa film, or the like positioned on the substrate 1, orientation films 3 of inorganic film made of $SiO_2$, SiO, or the like or an organic film made of polyimide, polyvinyl alcohol, nylon, acrylic resins, or the like for the orientation of liquid-crystal molecules positioned on the substrates 1 and the transparent conductive films 2, and a polarizer 4 positioned on the back face of the substrate 1. Both ends of each cell layer are sealed by sealing substances 6. A liquid-crystal layer 4 is disposed in each of the cell layers $C_1$ and $C_2$.

Figures 2A, 2B:
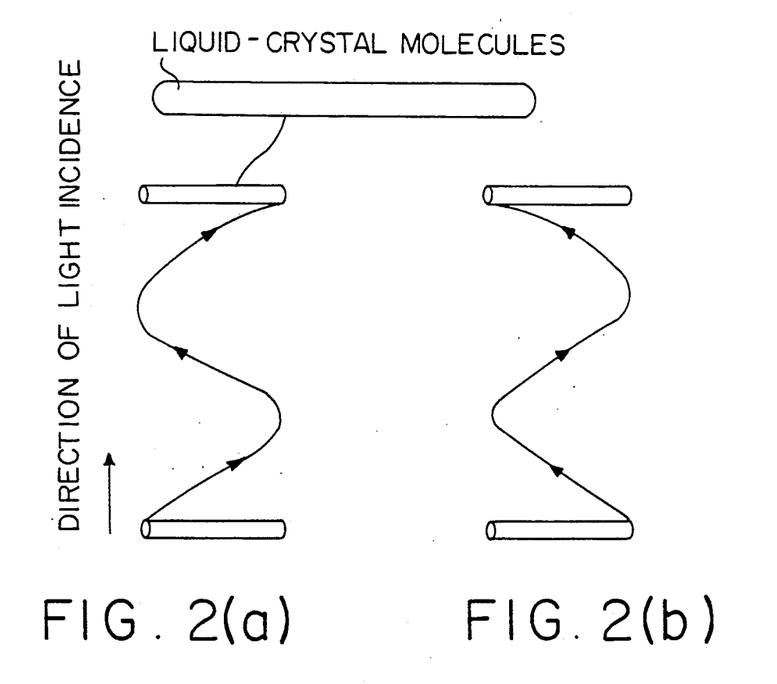
FIGS. 2a and 2b, respectively, are diagrams showing twists of liquid-crystal molecules in the right and left directions.

The direction in which the liquid-crystal molecules of the liquid-crystal layer 4 in one cell layer are helically twisted is opposite to the direction in which the liquid-crystal molecules of the liquid-crystal layer 4 in the other cell layer. The directions of twist of the liquid-crystal molecules are set as shown in FIGS. 2a and 2b in which FIG. 2a shows the twist of the liquid-crystal molecules in the right direction with regard to the direction in which light from a light source is incident upon the cell and FIG. 2b shows twist of the liquid-crystal molecules in the left direction with regard to the light incidence direction. When an optically active substance is added to a nematic liquid crystal, the liquid-crystal molecules form a twisted structure. To cause the liquid-crystal molecules to give rise to a twist in the right direction, the substance that is represented by the following chemical structure is used as an optically active substance:

To cause the liquid-crystal molecules to give rise to a twist in the left direction, cholesteryl nonanoate (Merck), S-811 (Merck), etc., are used as optically active substances.

Figure 3:
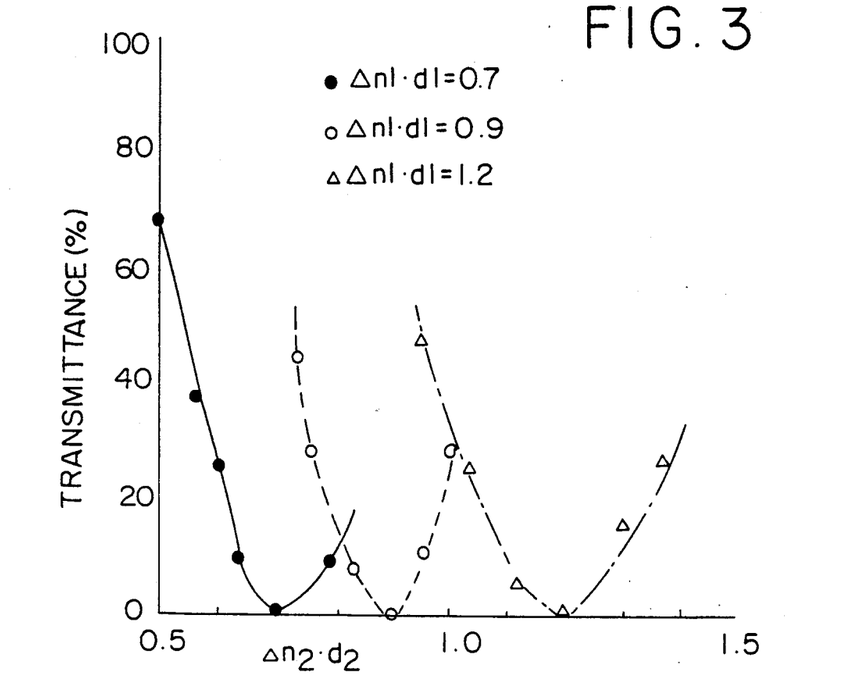
FIG. 3 is of characteristic curves showing the relationship between the $\Delta n_2 \cdot d_2$ of the second cell and the transmittance when a polarizer is placed in a crossed-Nicols manner with regard to the liquid-crystal display device of this invention.

The angles $\theta_1$ and $\theta_2$ of twist of the liquid-crystal molecules of the liquid-crystal layers in the first and second cell layers are set to be in the optimum range. The values $\Delta n_1 \cdot d_1$ and $\Delta n_2 \cdot d_2$ ($\Delta n_1$ and $\Delta n_2$ being the birefringence of the liquid crystals in the first and second cell layers, respectively, and $d_1$ and $d_2$ being the thicknesses of the liquid-crystal layers in the first and second cell layers, respectively) of the liquid-crystal layers in the first and second cell layers are also set to be in the optimum range. The above-mentioned optimum range for the angles $\theta_1$ and $\theta_2$ of twist of the liquid-crystal molecules and the values of $\Delta n_1 \cdot d_1$ and $\Delta n_2 \cdot d_2$ are set considering the following three requirements:

(1) FIG. 3 shows the relationship between the values of $\Delta n_1 \cdot d_1$ and $\Delta n_2 \cdot d_2$ and the transmittance in the case where $\theta_1$ and $\theta_2$ are set to be 90°, and polarizers are disposed in a crossed-Nicols manner and moreover, voltage is not applied. FIG. 3 indicates that when the value of $\Delta n_1 \cdot d_1$ of the first cell layer is equal to that of $\Delta n_2 \cdot d_2$ of the second cell layer, the transmittance becomes the lowest and a high contrast ratio can be achieved. This phenomenon arises because the light dispersion in the first cell layer is compensated by the second cell layer. The results mentioned above can be obtained not only when the angles $\theta_1$ and $\theta_2$ of twist are both set to be 90°, but also when they are set to be any degree. Moreover, even if the specific pitch of the twist of the liquid-crystal molecules in the first cell layer is different from that of the twist of the liquid-crystal molecules in the second cell layer, when the twisted structure has a desired angle of twist of the liquid-crystal molecules, the same results as mentioned above can be obtained.

Figure 4:
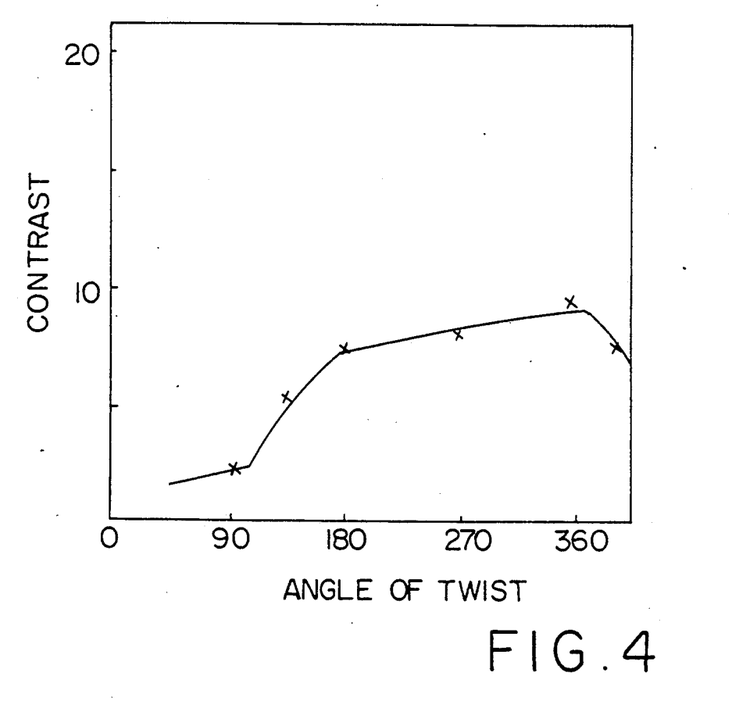
FIG. 4 is of a characteristic curve showing the relationship between the angle of twist of liquid-crystal molecules and the contrast ratio of display images.

In addition, by considering the display contrast and the visibility, as shown in FIG. 4, the angle of twist of the liquid-crystal molecules is preferably set to be in the range of about 180° to about 360° based on the relationship between the angle of twist and the contrast ratio. If the angle of twist of the liquid-crystal molecules exceeds 360°, a domain appears in which the liquid crystals have their orientation disarrayed at the time of the application of voltage, resulting in a dispersion of light, which readily gives rise to a decrease in contrast.

(2) To obtain sharp threshold characteristics of contrast, the specific pitch p of the twist of liquid-crystal molecules in one cell layer with a voltage-applying means becomes very important. The ratio of the thickness d of the liquid-crystal layer to the pitch p of the twist of the liquid-crystal molecules, d/p, is preferably set by use of experimental data as follows:

$$\theta/2\pi - \tfrac{1}{4} < d/p \lesssim \theta/2\pi.$$

wherein $\theta$ is the angle of twist of liquid-crystal molecules. This requirement applies in the case where the pretilt angle of the liquid crystals is about 10° or less. The said requirement is used in a normally closed display process in which the application of voltage makes the liquid crystals white.

Figure 5:
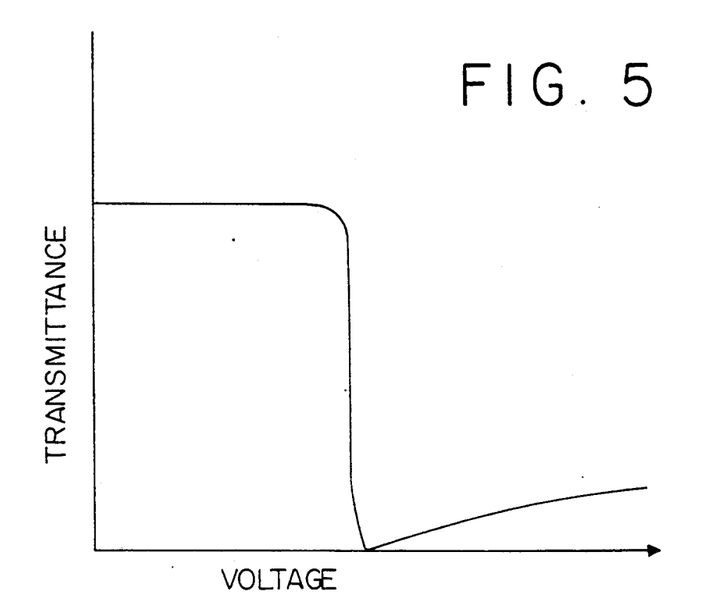
FIG. 5 is of a characteristic curve showing the relationship between the applied voltage and the transmittance with regard to a double-layered-type LCD.

(3) The third requirement mentioned below is used in a normally white display process. For example, when the product of the birefringence $\Delta n_1$ and the thickness $d_1$ of the liquid-crystal layer in the first cell layer, $\Delta n_1 \cdot d_1$, is 0.7 (i.e., $\Delta n_1 \cdot d_1 = 0.7$) and the product of the birefringence $\Delta n_2$ and the thickness $d_2$ of the liquid-crystal layer in the second cell layer, $\Delta n_2 \cdot d_2$, is 0.5 (i.e., $\Delta n_2 \cdot d_2 = 0.5$), and when the angle of twist of the liquid-crystal molecules in each of the first and second cell layers is 270°, the transmittance of light is about 70% at the time of the application of zero voltage. The transmittance drastically decreases, as shown in FIG. 5, with the application of voltage to the first cell layer. This is because the application of voltage causes the liquid-crystal molecules in the first cell layer to be raised up, which apparently makes the value of $\Delta n_1 \cdot d_1$ of the liquid-crystal layer in the first cell layer small, so that the value of $\Delta n_1 \cdot d_1$ becomes equal to that of $\Delta n_2 \cdot d_2$ of the liquid-crystal layer in the second cell layer. To attain such a phenomenon, the value of $\Delta n_2 \cdot d_2$ must be smaller than that of $\Delta n_1 \cdot d_1$. If the value of $\Delta n_2 \cdot d_2$ is exceedingly close to the value of $\Delta n_1 \cdot d_1$, as seen from FIG. 3, the transmittance at the time of the application of zero voltage becomes exceedingly low. Thus, the value of $\Delta n_2 \cdot d_2$ must meet the following inequality:

$$\Delta n_2 \cdot d_2 < 0.85 \Delta n_1 \cdot d_1$$

Moreover, the requirements with regard to the desired angle of twist of the liquid-crystal molecules and the desired ratio of d/p are the same as those of the angle of twist and the ratio of d/p in the case of the normally closed display process. Moreover, to obtain the state in which the liquid-crystal layers become white, the thickness of the liquid-crystal layers is preferably set to be about 10 μm or less in the case where $180° \leq \theta \leq 360°$.

EXAMPLE 1

Figure 6:
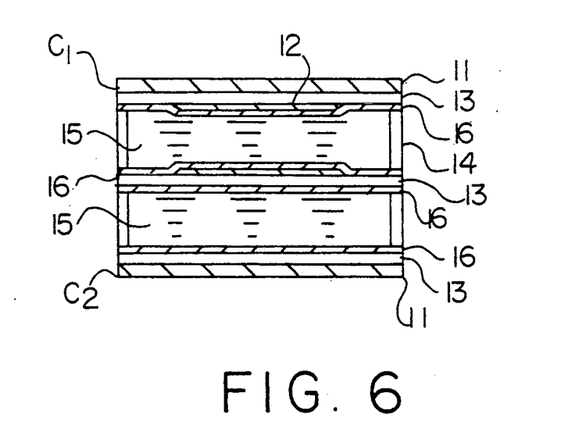
FIG. 6 is a sectional view showing another liquid-crystal display device (i.e., a double-layered type TN-LCD) of this invention.
Figure 7A:
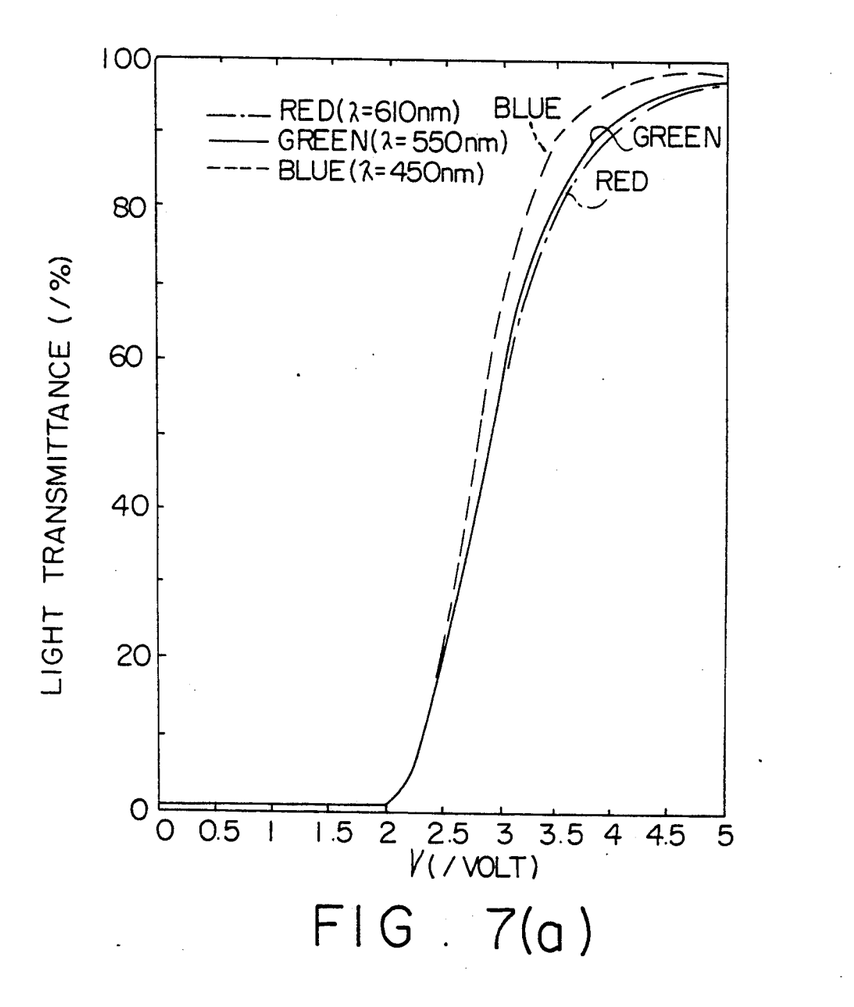
FIG. 7a is of characteristic curves showing the relationship between the applied voltage and the light transmittance with regard to the display device of FIG. 6 of this invention.
Figure 7B:
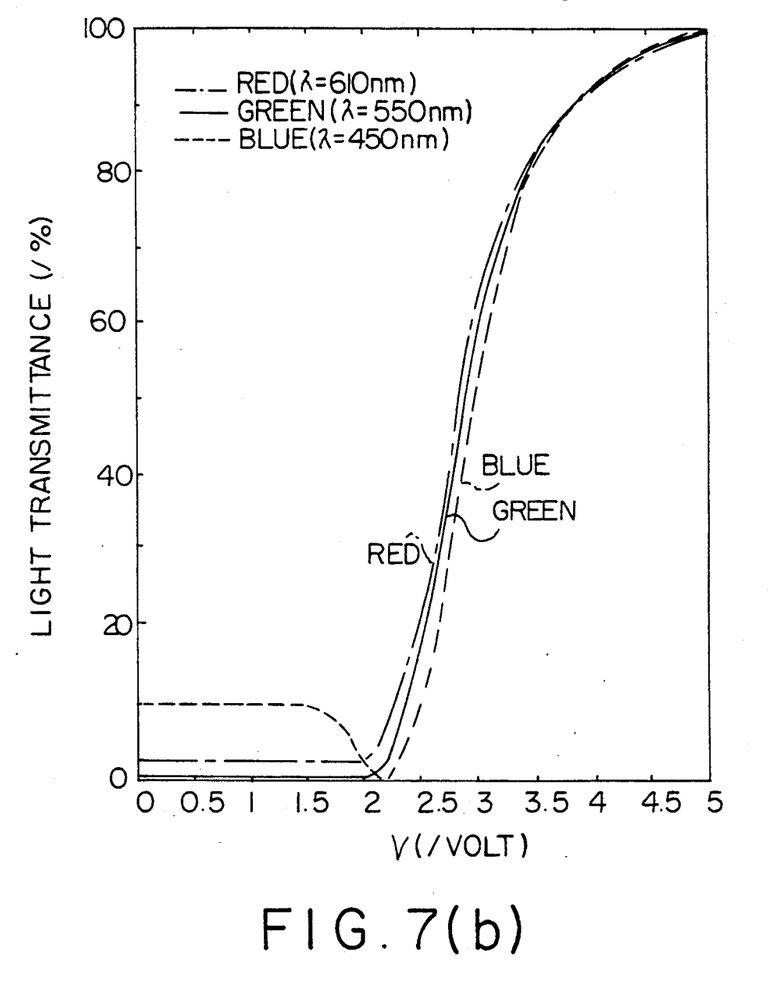
FIG. 7b is of characteristic curves showing the relationship between the applied voltage and the light transmittance with regard to a single-layered type TN-LCD.

FIG. 6 shows the double-layered cell structure of a liquid-crystal display device (i.e., a double-layered-type TN-LCD) of this invention, in which the angle of twist of the liquid-crystal molecules in each of the first and second cell layers $C_1$ and $C_2$ is 90°. A transparent conductive film 12 is disposed on each of the glass substrates 13 of the first cell layer $C_1$ alone by vapor deposition of ITO. On the glass substrates 13 and the transparent conductive films 12, liquid-crystal-molecule orientation films 16 of polyimide are formed with a thickness of about 1000 Å by a spin coating technique, the surfaces of which are treated by being rubbed with cloth, causing the liquid-crystal molecules to be in a twisted nematic orientation. The end portions of the cell layers are sealed by a sealing substance 14. As a liquid-crystal substance, a nematic liquid crystal, ZLI-3281 (Merck), is used. To the liquid-crystal layer 15 of the first cell layer $C_1$, 0.5 wt % of cholesteryl nonanoate is added and 0.15 wt % of CB15 is added to the liquid-crystal layer 15 of the second cell layer $C_2$. The angle of twist of the liquid-crystal molecules in the first cell layer $C_1$ is opposite to that of the liquid-crystal molecules in the second cell layer $C_2$. The thickness of the liquid-crystal layer in each of the first and second cell layers $C_1$ and $C_2$ (i.e., the thickness of each of the cell layers $C_1$ and $C_2$) is about 5 μm. Polarizers 11 are placed in a crossed-Nicols manner. FIGS. 7a and 7b show the dependence of the light transmittance on the applied voltage with regard to the double-layered-type TN-LCD of this invention and a reference standard single-layered-type TN-LCD, respectively, wherein the wavelengths λ used herein for red color, green color, and blue color are 610 nm, 550 nm, and 450 nm, respectively, indicating that at the time of the application of a voltage of the threshold value or less, the transmittance of the wavelength for each of red and blue in the double-layered-type cell is lower than that of the wavelength for each of red and blue in the single-layered-type cell. This means that the double-layered-type cell can attain high contrast. Moreover, the dependence of the applied-voltage-transmittance characteristics on the wavelengths with regard to the double-layered-type cell is much smaller than that of the applied-voltage-transmittance characteristics on the wavelengths with regard to the single-layered-type cell, and thus, when a full-color display is done, the double-layered-type cell can produce a display image with superior color reproducibility.

EXAMPLE 2

Figure 8:
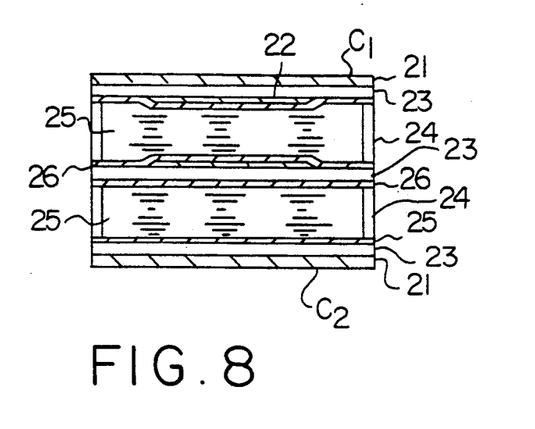
FIG. 8 is a sectional view showing another liquid-crystal display device (i.e., a double-layered-type SBE-LCD) of this invention.
Figure 9A:
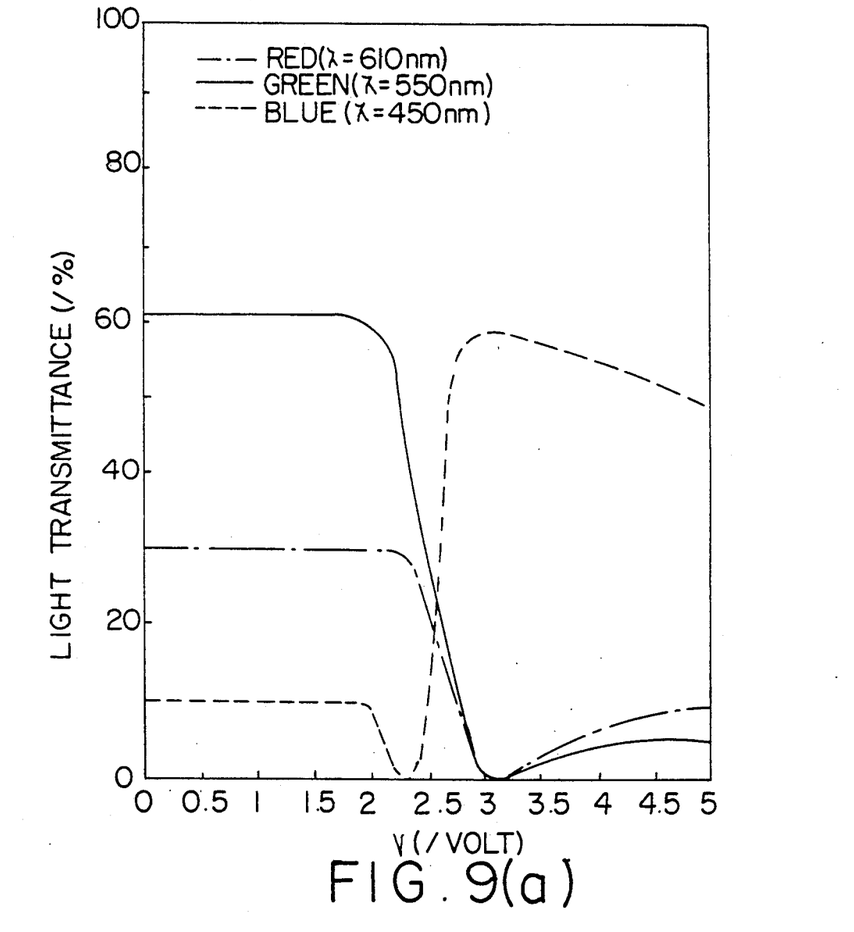
FIG. 9a is of characteristic curves showing the relationship between the applied voltage and the light transmittance with regard to a single-layered-type SBE-LCD.
Figure 9B:
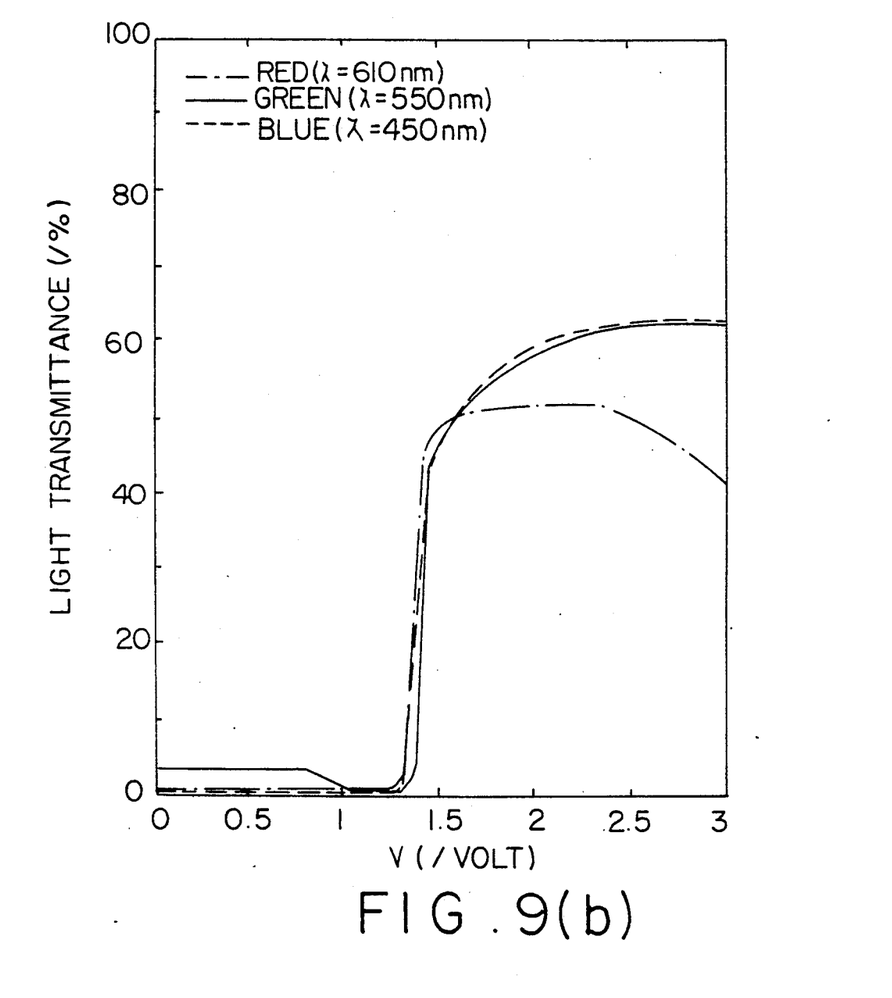
FIG. 9b is of characteristic curves showing the relationship between the applied voltage and the light transmittance with regard to the display device of FIG. 8 of this invention.

FIG. 8 shows another liquid-crystal display device (i.e., a double-layered-type SBE) of this invention, in which the angle of twist of the liquid-crystal molecules in each of the first and second cell layers $C_1$ and $C_2$ is 270° (that is, the liquid-crystal-molecules therein are supertwisted). A transparent conductive film 22 is disposed on each of the glass substrates 23 of the first cell layer $C_1$ alone by vapor deposition of ITO. On the glass substrates 23 and the transparent conductive films 22, liquid-crystal-molecule orientation films 26 of polyimide are formed with a thickness of about 1000 Å by a spin coating technique, the surfaces of which are treated by being rubbed with cloth, causing the liquid-crystal molecules to be oriented so that the direction of longitudinal axis of the liquid-crystal molecules becomes parallel to the substrates. The end portions of the cell layers are sealed by a sealing substance 24. As a liquid-crystal substance, a nematic liquid crystal, ZLI-3281 (Merck), is used. To the liquid-crystal layer 25 of the first cell layer $C_1$, 1.1 wt % of cholesteryl nonanoate is added and 0.94 wt % of CB15 is added to the liquid-crystal layer 25 of the second cell layer $C_2$. The pitch of the twist of the liquid-crystal molecules is about 8 μm and the pretilt angle of the liquid-crystal molecules positioned on the substrates is about 8°. The angle of twist of the liquid-crystal molecules in the first cell layer $C_1$ is opposite to that of the liquid-crystal molecules in the second cell layer $C_2$. The thickness of the liquid-crystal layer in each of the first and second cell layers $C_1$ and $C_2$ (i.e., the thickness of each of the cell layers $C_1$ and $C_2$) is about 5 μm. Polarizers 21 are placed in a crossed-Nicols manner as shown in FIG. 1. FIG. 9b shows the dependence of the light transmittance on the applied voltage with regard to the double-layered type SBE of this invention and FIG. 9a shows the same characteristics as mentioned above with regard to a reference standard single-layered-type SBE, wherein the wavelengths λ examined herein are 610 nm for red, 550 nm for green, and 450 nm for blue. FIGS. 9a and 9b indicate that at the time of the application of a voltage of the threshold value or less, the transmittance of each of the wavelengths in the double-layered-type cell is lower than that of each of the wavelengths in the single-layered-type cell. Moreover, the said double-layered-type cell has sharp threshold characteristics that are peculiar to SBE cells, so that the said cell can produce a display image with high contrast at the time of a high duty drive. Moreover, since the dependence of the applied-voltage-transmittance characteristics on the wavelengths with regard to the double-layered-type cell is smaller than that of the said characteristic on the wavelengths with regard to the single-layered-type cell, the said double-layered-type cell is useful for a color display.

EXAMPLE 3

Figure 10:
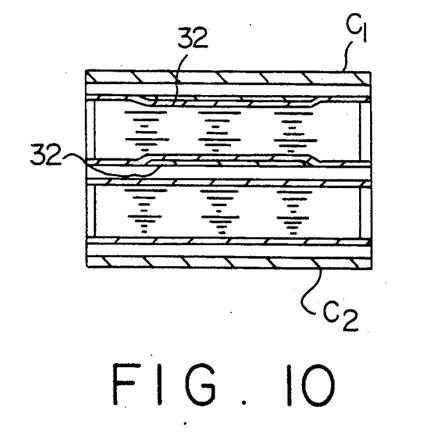
FIG. 10 is a sectional view showing another liquid-crystal display device (i.e., a double-layered-type SBE-LCD) of this invention.
Figure 11A:
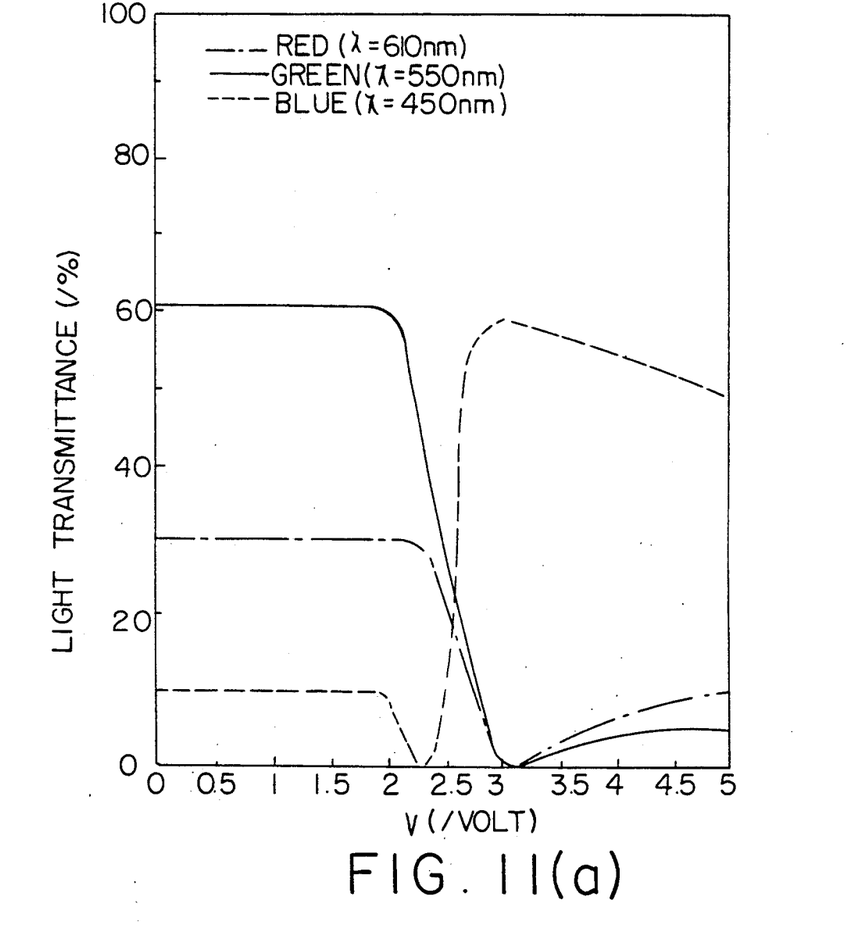
FIG. 11a is of characteristic curves showing the relationship between the applied voltage and the light transmittance with regard to a single-layered-type SBE-LCD.
Figure 11B:
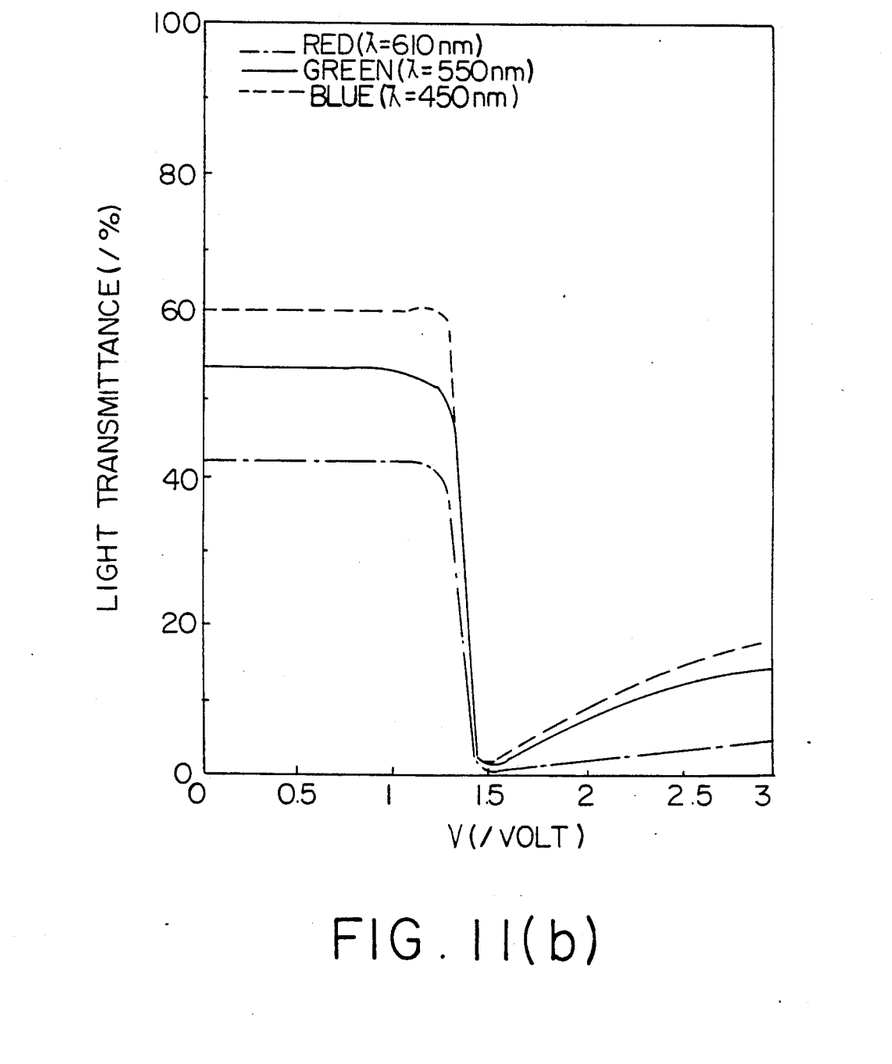
FIG. 11b is of characteristic curves showing the relationship between the applied voltage and the light transmittance with regard to the display device of FIG. 10 of this invention.

FIG. 10 shows another liquid-crystal display device (i.e., a double-layered-type SBE) of this invention, in which the angle of twist of the liquid-crystal molecules in each of the first and second cell layers $C_1$ and $C_2$ is 270° C., that is, the molecules therein are supertwisted). The values of $\Delta n_1 \cdot d_1$ of the first cell layer $C_1$ and $\Delta n_2 \cdot d_2$ of the second cell layer $C_2$ are adjusted to 0.7 and 0.5, respectively, by changing the thicknesses of the cell layers. The cell structure of this display device is the same as that of Example 2 except that this display device has electrodes 32 for the application of voltage in the first cell layer $C_1$. FIG. 11b shows the dependence of the light transmittance on the applied voltage with regard to the double-layered-type SBE of this invention, and FIG. 11a shows the same characteristics as mentioned above with regard to a reference standard single-layered-type SBE in which the angle of twist of the liquid-crystal molecules in the single cell layer is 270°. It can be seen from FIGS. 11a and 11b that the double-layered cell has sharp threshold characteristics that are peculiar to SBE cells and also that the change in the characteristics of the double-layered cell with regard to the wavelengths for red, green, and blue is much smaller than that in the characteristics of the single-layered cell. Thus, the double-layered cell can attain a color display image with high contrast.

EXAMPLE 4

Inside the liquid-crystal cell layer with a voltage-applying means of each of the display devices in the above-mentioned examples, color (red, green, and blue) filter layers of a gelatin film are disposed. The display devices with the color filter layers are subjected to a duty drive, with the formation of a distinct, clear color image. These liquid-crystal display devices are useful for full-color display and multi-color display.

EXAMPLE 5

The liquid-crystal cells of this invention are used in place of a liquid-crystal panel with color filters that is provided with a TFT (Thin Film Transistor) as an active device, and are examined for color display tests by an active matrix drive. They produce a distinct and clear color image, so they are useful for full-color display and multi-color display.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. A liquid-crystal display device comprising:
a double-layered-type liquid-crystal cell that is composed of a first cell layer and a second cell layer, said cell containing liquid-crystal molecules with a twisted nematic orientation therein and
a voltage-applying means in one of the first and second cell layers,
wherein the angle of twist of the liquid-crystal molecules in the first cell layer is opposite to that of twist of the liquid-crystal molecules in the second cell layer, said angle of twist of the liquid-crystal molecules in each of the first and second cell layers being in the range of 180° to 360°, and the orientation of the liquid-crystal molecules in the first cell layer in the vicinity of the second cell layer is at right angles to that of the liquid-crystal molecules in the second cell layer in the vicinity of the first cell layer, wherein $$\Delta n_2 d_2 < 0.85 \Delta n_1 d_1,$$

wherein the relationship between the pitch p of twist of the liquid-crystal molecules in the cell layer that has the voltage-applying means therein and the thickness d of the liquid-crystal layer in the said cell layer is as follows:

$$\theta/2\pi - \tfrac{1}{4} < d/p \lesssim \theta/2\pi$$

wherein $\theta$ is the angle of twist of the liquid-crystal molecules.

2. A liquid-crystal display device comprising:
a double-layered-type liquid-crystal cell that is composed of a first cell layer and a second cell layer, said cell containing liquid-crystal molecules with a twisted nematic orientation therein and
a voltage-applying means in one of the first and second cell layers,
wherein the angle of twist of the liquid-crystal molecules in the first cell layer is opposite to that of twist of the liquid-crystal molecules in the second cell layer, said angle of twist of the liquid-crystal molecules in each of the first and second cell layers being in the range of 180° to 360°, and the orientation of the liquid-crystal molecules in the first cell layer in the vicinity of the second cell layer is at right angles to that of the liquid-crystal molecules in the second cell layer in the vicinity of the first cell layer, wherein $$\Delta n_2 d_2 < 0.85 \Delta n_1 d_1,$$

and
wherein the relationship between the pitch p of twist of the liquid-crystal molecules in the cell layer that has the voltage-applying means therein and the thickness d of the liquid-crystal layer in the said cell layer is as follows:

$$\theta/2\pi - \tfrac{1}{4} < d/p < \theta/2\pi$$

wherein $\theta$ is the angle of twist of the liquid-crystal molecules, and wherein a color filter layer is disposed in at least one of the first and second cell layers.

3. A liquid-crystal display device comprising:
a double-layered-type liquid-crystal cell that is composed of a first cell layer and a second cell layer, said cell containing liquid-crystal molecules with a twisted nematic orientation therein and
a voltage-applying means in one of the first and second cell layers,
wherein the angle of twist of the liquid-crystal molecules in the first cell layer is opposite to that of twist of the liquid-crystal molecules in the second cell layer, said angle of twist of the liquid-crystal molecules in each of the first and second cell layers being in the range of 180° to 360°, and the orientation of the liquid-crystal molecules in the first cell layer in the vicinity of the second cell layer is at right angles to that of the liquid-crystal molecules in the second cell layer in the vicinity of the first cell layer, wherein $$\Delta n_2 d_2 < 0.85 \Delta n_1 d_1,$$

and wherein the relationship between the pitch p of twist of the liquid-crystal molecules in the cell layer that has the voltage-applying means therein and the thickness d of the liquid-crystal layer in the said cell layer is as follows:

$$\theta/2\pi - \tfrac{1}{4} < d/p < \theta/2\pi$$

wherein $\theta$ is the angle of twist of the liquid-crystal molecules, and wherein an active device is disposed on each picture element in at least one of the first and second cell layers.

* * * * *